United States Patent Office 3,444,254
Patented May 13, 1969

3,444,254
PROCESS FOR THE MANUFACTURE OF CYCLODODECATRIENE-(1,5,9)
Walter Herwig, Frankfurt am Main, Germany, assignor to Farbwerke Hoechst Aktiengesellschaft vormals Meister Lucius & Bruning, Frankfurt am Main, Germany, a corporation of Germany
No Drawing. Filed May 16, 1967, Ser. No. 638,754
Claims priority, application Germany, May 21, 1966, F 49,257
Int. Cl. C07c 3/20
U.S. Cl. 260—666    16 Claims

ABSTRACT OF THE DISCLOSURE

Process for making cyclododecatriene-(1,5,9) or trimethyl cyclododecatrienes-(1,5,9) by trimerizing conjugated dienes with 4 to 5 carbon atoms in a liquid form in the presence of mixed catalysts containing complex compounds of titanium tetrahalides with phosphoric acid tris-dialkylamides.

---

The present invention relates to a process for the manufacture of cyclododecatriene-(1,5,9).

Various processes have already been known for the cyclic trimerization of butadiene in the presence of organometallic catalysts. German Patent 1,050,333, for example, describes a process for making cyclododecatriene-(1,5,9) by introducing butadiene into a catalyst suspension of titanium tetrachloride and diethylaluminum monochloride.

The process disclosed in German Patent 1,043,329 uses chromium(III)chloride as a heavy metal component.

Belgian Patents 633,646 and 621,730 and French Patent 1,398,383 describe processes for oligomerizing dienes which contain nickel as a catalyst component in addition to aluminum alkyls.

According to French Patent 1,393,071 Lewis bases are used as catalyst components in order to check polymerization which often takes place as a side reaction in the oligomerization of diolefins.

The present invention provides a process for the manufacture of cyclododecatriene-(1,5,9) and trimethyl cyclododecatriene homologs which comprises contacting conjugated dienes having 4 or 5 carbon atoms in a liquid form with mixed catalysts consisting of (a) complex compounds of titanium tetrahalides with phosphoric acid tris-dialkylamides of the following formula

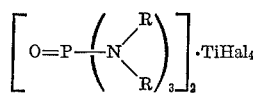

in which each R stands for a straight-chain or branched alkyl group with 1 to 4 carbon atoms, and (b) aluminum alkyls which may contain chlorine, in a ratio of Ti:Al within the range of 1:3 to 1:20.

As aluminum alkyls and/or alkyl aluminum chlorides, compounds containing straight-chain or branched alkyl groups with advantageously 1 to 10 carbon atoms may be used. As alkyl aluminum chlorides, dialkyl aluminum monochlorides and aluminum monoalkyl dichlorides may be used; it is particularly advantageous to use ethylaluminum sesquichloride, i.e. an about equimolar mixture of ethylaluminum dichloride and diethylaluminum monochloride.

The process in accordance with the invention which uses a catalyst system of high activity and specificity, enables conjugated diolefins, for example, butadiene-1,3 and its methyl substitution products isoprene and pentadiene-1,3, advantageously butadiene-1,3, to be trimerized in a liquid form to cyclododecatriene-(1,5,9) or trimethyl cyclododecatrienes-(1,5,9), advantageously cyclododecatriene-(1,5,9).

The catalyst to be used in accordance with the invention is obtained by first preparing, according to German Patent 1,161,251, the complex compound of a titanium tetrahalide and a phosphoric acid tris-dialkylamide, for example the complex compound of titanium tetrachloride and phosphoric acid trisdimethylamide, designated hereinafter "PTDA," of the formula [TiCl₄·(PTDA)₂], which is obtainable in a crystalline form, and then suspending it in an organic solvent, for example, benzene, toluene, heptane or tetrachlorethylene. Alternatively, a phosphoric acid tris-dialkylamide, advantageously PTDA, may be added to a solution of titanium tetrachloride in one of the above solvents in a molar ratio of Ti:P within the range of 1:2 to 1:3, advantageously of 1:2.

To the catalyst component obtained in the form of a suspension by one of the above known methods an aluminum alkyl, advantageously ethylaluminum sesquichloride, is added, in accordance with the invention, in a molar ratio of Ti:Al within the range of 1:3 to 1:20, advantageously 1:4 to 1:12. When a conjugated diene, for example, butadiene-1,3, isoprene or pentadiene-1,3, is added to the catalysts used in accordance with the invention, trimerizing cyclization often sets in already at room temperature with a high speed and a strong exothermic reaction. It is a special advantage of the process in accordance with the invention that the reaction can be carried out in liquid monomers, i.e. with a high concentration of monomer, without an uncontrollable and spontaneous polymerization taking place even at high reaction temperatures of 100 to 200° C.

When, however, the process is carried out using catalysts containing no phosphoric acid amide, only polymeric products but no cyclododecatriene-(1,5,9) are obtained as shown in Comparison Examples 10 and 11 herein. With the catalysts used in accordance with the invention, the desired cyclododecatrienes-(1,5,9) are obtained in yields generally exceeding 90%. By-products such as cyclooctadiene or vinyl cyclohexene, oligomers and polymers are formed in amounts which generally do not exceed 5%. When, for example, a catalyst suspension of 4.4 grams [TiCl₄·(PTDA)₂] and 7.2 cc. ethylaluminum sesquichloride in 50 cc. benzene is added to 1 kg. butadiene in a pressure vessel, reaction sets in spontaneously at 30° C., the temperature rising to about 80° C. After a time of reaction of 60 minutes, more than 900 grams cyclododecatriene-(1,5,9) are obtained by distillation.

In an advantageous form of executing the process in accordance with the invention, the catalyst is placed in the pressure vessel in the form of a suspension and then a determined amount of conjugated diene, advantageously butadiene, is introduced. The reaction is controlled with the help of the course of the temperature and/or the pressure and further amounts of the diene are introduced until the vessel is either full of reaction product or the catalyst has been consumed. It is also possible, however, to carry out the trimerization at a determined reaction temperature by continuously adding the diene in a constant amount or by placing the diene in a liquid form in the reaction vessel and introducing the catalyst suspension continuously or discontinuously. The reaction products obtained by the process in accordance with the invention make valuable intermediate products for the manufacturer of ketones, oximes and lactams. Laurine lactam, for example, can be polymerized to Nylon 12.

The following examples serve to illustrate the invention, but are not intended to limit it.

Example 1

In a Schlenk tube, 7.2 cc. ethylaluminum sesquichloride were added at +5° C. to a suspension of 4.4 grams [TiCl₄·(PTDA)₂] in 50 cc. benzene. An etremely finely divided brown catalyst suspension was obtained which was filled under nitrogen into a 1 liter glass autoclave. 600 grams liquid butadiene were then added at −10° C. The contents of the autoclave were heated to 30° C., the pressure adjusting itself to 3 atmospheres gage. At the said temperature the reaction got under way rapidly, which was evidenced by an increase in temperature and pressure. By external cooling, an internal temperature of at most 80° C., and a pressure of at most 6 atmospheres gage were maintained. After 1 hour, the reaction was terminated; at an internal temperature at 40° C., the pressure dropped to atmospheric pressure. The catalyst was decomposed with methanol, the benzene was removed under atmospheric pressure, and 530 grams cyclododecatriene-(1,5,9)=88.4% of the theory were obtained at 84° C. to 86° C. under a pressure of 6 millimeters of mercury. As residue 20 grams of an oil of low viscosity were obtained.

Example 2

The process was carried out as described in Example 1 while using 10.6 cc. ethylaluminum sesquichloride. Reaction set in already at 20° C.; the reaction was, however, violent and in spite of strong cooling a temperature of 120° C. was reached within a few minutes. After 30 to 40 minutes the reaction was terminated. By working up as described in Example 1, 540 grams cyclododecatriene-(1,5,9)=90% of the theory and 50 grams of an oil of low viscosity were obtained.

Examples 3 to 8

The examples are set forth in the following table.
The mode of procedure corresponded in every respect to that described in the preceding examples.

TABLE

| Ex. | Catalyst | Dispersing agent | Monomer | Reaction time, hours | Temperature, °C. | Product |
|---|---|---|---|---|---|---|
| 3 | 4.4 g. [TiCl₄.(PTDA)₂], 5.3 cc. ethylaluminum sesquichloride. | 50 cc. benzene | 300 g. butadiene | 4 | 75 | 210 g. cyclododecatriene-(1,5,9). |
| 4 | 0.87 cc. TiCl₄, 2.9 cc. PTDA, 7.2 cc. ethylaluminum sesquichloride. | do | 600 g. butadiene | 1½ | 85 | 575 g. cyclododecatriene-(1,5,9). |
| 5 | 4.4 g. [TiCl₄.(PTDA)₂], 8.1 cc. diethylaluminum-monochloride. | do | 400 g. butadiene | 4½ | 80 | 120 g. cyclododecatriene-(1.5.9). |
| 6 | 4.4 g. [TiCl₄.(PTDA)₂], 7.2 cc. ethylaluminum-sesquichloride. | 150 cc. heptane | 600 g. butadiene | 2 | 80 | 490 g. cyclododecatriene-(1.5.9). |
| 7 | do | 100 cc. tetrachlorethylene. | do | 2 | 60 | 510 g. cyclododecatriene-(1,5,9). |
| 8 | do | 50 cc. benzene | 200 g. isoprene | 3 | 85 | 120 g. trimethyl-cyclododecatriene-(1,5,9). |

Example 9

The catalyst described in Example 1 was prepared in 100 cc. benzene and stirred under nitrogen in a ½ liter round-bottomed flask. At a temperature of the bath within the range of 45 to 60° C., 200 grams butadiene were passed through the catalyst suspension within 5 hours. By working up 120 grams cyclodoecatriene-(1,5,9) were obtained.

Comparison Example 10

In a glass autoclave, a known catalyst suspension was prepared from 1 cc. TiCl₄ and 4.5 cc. ethylaluminum sesquichloride in 100 cc. benzene. After the addition of 400 cc. butadiene, the autoclave was heated to 25° C. After 50 minutes, a wax-like polymer but no cyclododecatriene-(1,5,9) had formed in a substantially quantitative yield.

Comparison Example 11

The process was carried out as described in Example 10 while using 1.4 cc. TiCl₄ and 6.2 cc. diethylaluminum monochloride for the preparation of the known catalyst suspension. Only wax-like polymers but no cyclododecatrienes-(1,5,9) were obtained.

What is claimed is:

1. A process for the manufacture of cyclododecatriene-(1,5,9) and trimethyl cyclododecatriene homologs which comprises contacting a conjugated diene with 4 to 5 carbon atoms in a liquid form with a mixed catalyst consisting of (a) a complex compound of a titanium tetrahalide with a phosphoric acid tris-dialkylamide of the following formula

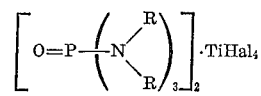

in which each R stands for a straight-chain or branched alkyl group with 1 to 4 carbon atoms, and (b) an aluminum alkyl which may contain chlorine, in a ratio of Ti:Al within the range of 1:3 to 1:20.

2. The process of claim 1 wherein the conjugated diene is butadiene-1,3.

3. The process of claim 1 wherein the conjugated diene is isoprene.

4. The process of claim 1 wherein the conjugated diene is pentadiene-1,3.

5. The process of claim 1 wherein the titanium tetrahalide is TiCl₄.

6. The process of claim 1 wherein the alkyl group R is an ethyl group.

7. The process of claim 1 wherein the alkyl group R is 2-propyl.

8. The process of claim 1 wherein the alkyl group R is n-butyl.

9. The process of claim 1 wherein the alkylaluminum chloride is ethylaluminum sesquichloride.

10. The process of claim 1 wherein the ratio of Ti:Al is within the range of 1:4 to 1:12.

11. The process of claim 1 wherein the ratio of Ti:P is within the range of 1:2 to 1:3.

12. The process of claim 1 wherein the phosphoric acid trisdialkylamide is tris-dimethylamide.

13. The process of claim 1 wherein the catalyst containing

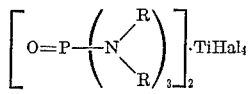

is placed in the reaction vessel in the form of a suspension in an organic solvent and the conjugated diene is then added.

14. The process of claim 13 wherein the organic solvent is an aliphatic hydrocarbon.

15. The process of claim 13 wherein the organic solvent is an aromatic hydrocarbon.

16. The process of claim 13 wherein the organic solvent is a halogenated aliphatic hydrocarbon.

References Cited

UNITED STATES PATENTS

| 3,214,484 | 10/1965 | Wittenberg | 260—666 |
| 3,149,174 | 9/1964 | Mueller | 260—666 |
| 3,167,593 | 1/1965 | Mueller | 260—666 |
| 3,344,199 | 9/1967 | Brenner | 260—666 |
| 3,149,173 | 9/1964 | Wittenberg | 260—666 |

FOREIGN PATENTS 1,032,489  6/1966  Great Britain.

DELBERT E. GANTZ, *Primary Examiner.*

V. O'KEEFE, *Assistant Examiner.*